United States Patent
Korczak

(10) Patent No.: US 9,606,297 B2
(45) Date of Patent: Mar. 28, 2017

(54) TRANSITION CONNECTOR FOR HYBRID FIBER OPTIC CABLE

(71) Applicant: CommScope Technologies LLC, Hickory, NC (US)

(72) Inventor: Richard L. Korczak, Channahon, IL (US)

(73) Assignee: CommScope Technologies LLC, Hickory, NC (US)

( * ) Notice: Subject to any disclaimer, the term of this patent is extended or adjusted under 35 U.S.C. 154(b) by 341 days.

(21) Appl. No.: 14/293,434

(22) Filed: Jun. 2, 2014

(65) Prior Publication Data

US 2016/0202429 A1  Jul. 14, 2016

Related U.S. Application Data

(60) Provisional application No. 61/838,483, filed on Jun. 24, 2013, provisional application No. 61/838,466, filed on Jun. 24, 2013.

(51) Int. Cl.
*G02B 6/38* (2006.01)
*H01B 11/22* (2006.01)
*G02B 6/44* (2006.01)
*H01R 11/05* (2006.01)
*H01R 4/58* (2006.01)
*H01R 33/945* (2006.01)

(52) U.S. Cl.
CPC .......... *G02B 6/3817* (2013.01); *G02B 6/387* (2013.01); *G02B 6/3807* (2013.01); *G02B 6/3825* (2013.01); *G02B 6/3879* (2013.01); *G02B 6/3885* (2013.01); *G02B 6/4416* (2013.01); *H01B 11/22* (2013.01); *H01R 4/58* (2013.01); *H01R 11/05* (2013.01); *G02B 6/4471* (2013.01); *H01R 33/945* (2013.01)

(58) Field of Classification Search
CPC .... G02B 6/3817; G02B 6/387; G02B 6/3825; G02B 6/3879; G02B 6/3885; G02B 6/4471; G02B 6/3807; G02B 6/4416; H01R 4/58; H01R 11/05; H01R 13/502; H01B 11/22
USPC ............ 385/53–85, 101–103, 107, 113, 139; 439/577
See application file for complete search history.

(56) References Cited

U.S. PATENT DOCUMENTS

| 4,922,058 A | 5/1990 | Rodrigues |
| 4,952,256 A | 8/1990 | Schauer et al. |
| 2006/0056969 A1 | 3/2006 | Jacala et al. |
| 2007/0263961 A1* | 11/2007 | Khemakhem ........ G02B 6/3817 385/75 |
| 2011/0188810 A1 | 8/2011 | Ciechomski et al. |

(Continued)

FOREIGN PATENT DOCUMENTS

EP  2387111  11/2011

OTHER PUBLICATIONS

Extended European Search Report for Corresponding European Application No. 14173563.9, Apr. 29, 2015, 10 pages.

*Primary Examiner* — Akm Enayet Ullah
*Assistant Examiner* — Michael Mooney
(74) *Attorney, Agent, or Firm* — Myers Bigel, P.A.

(57) ABSTRACT

A connector assembly for interconnecting hybrid optical fiber cables includes a connector module and a housing within which the connector module resides. The connector module includes: a mounting substrate; a plurality of fiber optic adapters mounted on the mounting substrate; and a plurality of power ports mounted on the mounting substrate.

8 Claims, 5 Drawing Sheets

(56) References Cited

U.S. PATENT DOCUMENTS

| | | |
|---|---|---|
| 2012/0027361 A1 | 2/2012 | Brower et al. |
| 2012/0263420 A1 | 10/2012 | Benton et al. |
| 2012/0315800 A1 | 12/2012 | Tseng et al. |
| 2013/0146355 A1 | 6/2013 | Strasser et al. |
| 2014/0027153 A1 | 1/2014 | Harwath |

* cited by examiner

TRANSITION CONNECTOR FOR HYBRID FIBER OPTIC CABLE

RELATED APPLICATIONS

The present application claims priority from and the benefit of U.S. Provisional Patent Application No. 61/838,483, filed Jun. 24, 2013 and U.S. Provisional Patent Application No. 61/838,466, filed Jun. 24, 2013, the disclosures of each of which are hereby incorporated herein in their entireties.

FIELD OF THE INVENTION

The present invention is directed generally to connectors, and more specifically to fiber optic and power connectors.

BACKGROUND OF THE INVENTION

Latest developments in technology for delivering power and data in wireless infrastructure use hybrid cables. As used herein, the term "hybrid optical fiber cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable.

In order to use a single hybrid trunk cable, at some point the trunk cable must transition to hybrid jumper cables. Typically, these are distributed inside an enclosure that transitions the trunk power conductor gauge to the jumper power conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

SUMMARY

As a first aspect, embodiments of the invention are directed to a connector assembly for interconnecting hybrid optical fiber cables. The connector assembly comprises a connector module and a housing within which the connector module resides. The connector module comprises: a mounting substrate; a plurality of fiber optic adapters mounted on the mounting substrate; and a plurality of power ports mounted on the mounting substrate.

As a second aspect, embodiments of the invention are directed to a cable-connector assembly. The cable-connector assembly comprises a connector assembly, a hybrid optical fiber cable, and a plurality of hybrid optical fiber jumper cables. The connector assembly comprises: (i) a connector module comprising: a mounting substrate; a plurality of fiber optic adapters mounted on the mounting substrate; and a plurality of power ports mounted on the mounting substrate; and (ii) a housing within which the connector module resides. The hybrid optical fiber cable is inserted into the housing and attached to the fiber optic adapters and the power ports, and the plurality of hybrid optical fiber jumper cables is inserted into the housing and attached to the fiber optic adapters and the power ports.

As a third aspect, embodiments of the invention are directed to a connector for interconnecting a round cable with a flat cable, comprising: a body having opposed end faces; at least one slot extending between the end faces, the slot having a rectangular profile; and upper and lower recesses extending, respectively, upwardly and downwardly from the slot, the upper and lower recesses being generally semicylindrical and aligned with each other.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
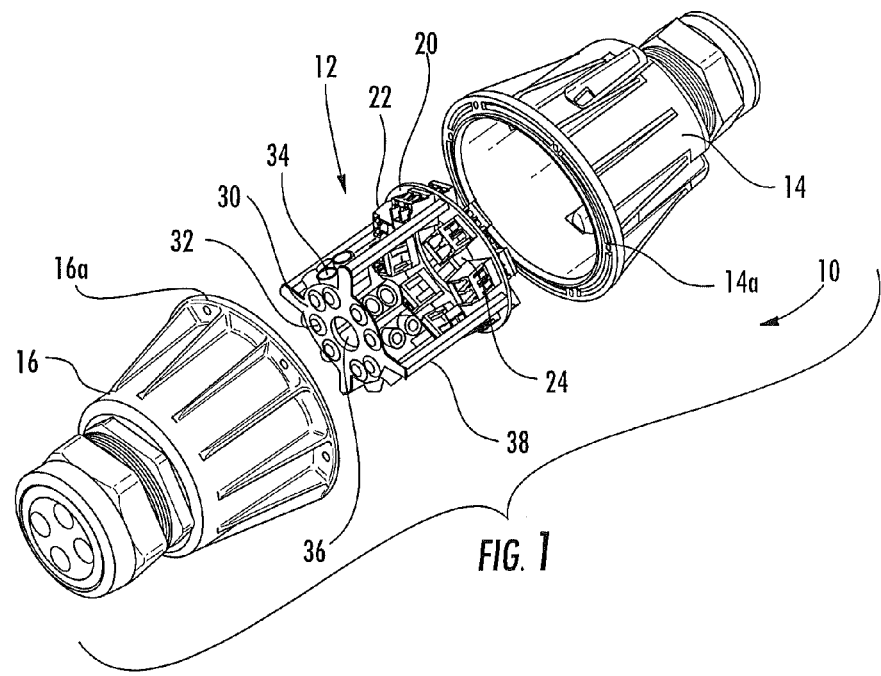
FIG. 1 is an exploded perspective view of a connector assembly for joining optical fibers and a power conductor of a hybrid optical fiber cable according to embodiments of the present invention.

Referring now to the figures, a connector assembly, designated broadly at 10, is illustrated in FIG. 1. The connector assembly 10 has the capability of interconnecting hybrid optical fiber cables (i.e., cables that include both optical fibers and conductors for power transmission), and in particular may be suitable for interconnecting extended length hybrid optical fiber cables to shorter length jumper cables, and/or for connecting a single hybrid optical fiber cable with multiple hybrid optical fiber cables. The connector assembly 10 includes a connector module 12 and mating housings 14, 16 within which the connector module 12 resides. These components are described in greater detail below.

The connector module 12 includes a base plate 20 on which eight separate LC adapters 22 are mounted. The LC adapters 22, which connect optical fibers, are of conventional construction and need not be described in detail herein. In some embodiments, other varieties of fiber optic couplers or adapters may be employed. The base plate 20, which is typically formed of polymeric material, such as polyvinyl chloride (PVC), includes a central aperture 24.

The connector module 12 also includes a base plate 30 on which eight power ports 32 are mounted. Each of the power ports 32 includes two screw holes 34 that enable power conductors to be connected within the ports 32. The base plate 30 is typically formed of tin-plated copper and includes a central aperture 36. The base plate 30 is mounted in spaced relationship to the base plate 20 via four spacers 38.

The housings 14, 16, which in the illustrated embodiment take the shape of hollow truncated cones, are configured to hold the connector module 12 therein. At its narrow end, the housing 14 includes a fitting that enables it to be attached to a hybrid fiber optic cable (not shown), which includes multiple optical fibers and power conductors. An exemplary hybrid optical fiber cable is the HELIAX® FiberFeed® Hybrid Cable, available from CommScope, Inc. (Joliet, Ill.). At its narrow end, the housing 16 includes a fitting that receives four hybrid fiber optic jumper cables, or "direct tails" (not shown), wherein each jumper cable/direct tail corresponds to one "channel" of two power conductors and two optical fibers. An exemplary jumper cable is the HELIAX® FiberFeed® Direct tail, also available from CommScope, Inc.

The housings 14, 16 are typically formed of a polymeric material, such as PVC. The housings 14, 16 may be attached to each other by any manner of fastening methods; in the illustrated embodiment, they are attached via screws inserted into their rims 14a, 16a.

Under typical circumstances, the hybrid fiber optic cable would be terminated with the housing 14 at the factory, such that the optical fibers of the cable are threaded through the fitting of the housing 14 and inserted into the LC adapters 22, and the power conductors of the cable are threaded though the fitting of the housing 14 and inserted into the power ports 32. Hybrid fiber optic jumper cables would be inserted into each of the openings in the fitting of the housing 16, then inserted into the LC adapters 22 and the power ports 32. The optical fibers that are inserted through the housing 16 pass through the central aperture 36 of the base plate 30. Similarly, the power conductors that are inserted through the housing 14 pass through the central aperture 24 of the base plate 20. The housings 14, 16 can then be attached together via screws or the like.

The connector assembly 10 can provide an enclosed connection point for hybrid fiber optic cables and jumper cables that is relatively compact and unobtrusive. In some embodiments, the assembled housings 14, 16 have dimensions of between about 4 and 6 inches in diameter and 9 and 12 inches in length.

Figure 2:
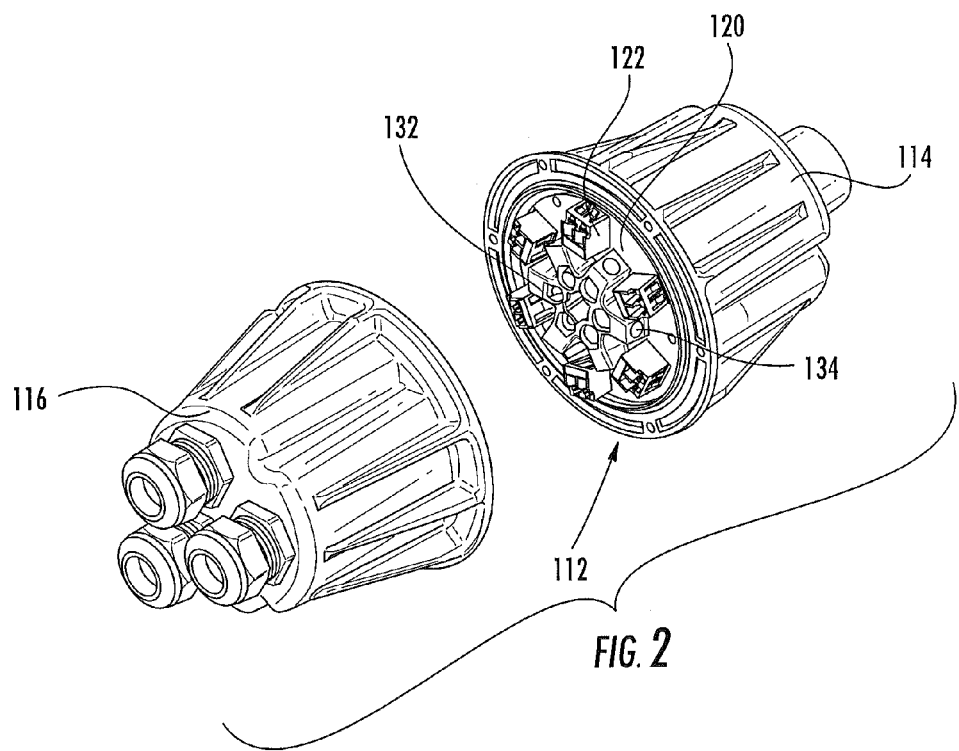
FIG. 2 is a partially dissembled perspective view of another connector assembly according to embodiments of the present invention.

Connector modules of differing configurations can also be used. Referring now to FIG. 2, a connector module 112 is shown mounted in a housing 114, with a mating housing 116 illustrated also. The connector module 112 includes only a single base plate 120 as a mounting substrate, on which six LC adapters 122 and six power ports 132 are mounted. The LC adapters 122 are mounted near the periphery of the base plate 120, and the power ports 132 are mounted radially inward from the LC adapters 122. Notably, the LC adapters 122 and power ports 132 are mounted such that they are staggered from each other, which provides space for a technician to insert and tighten a screw in each of the screw holes 134 of the power ports 132.

Figure 4:
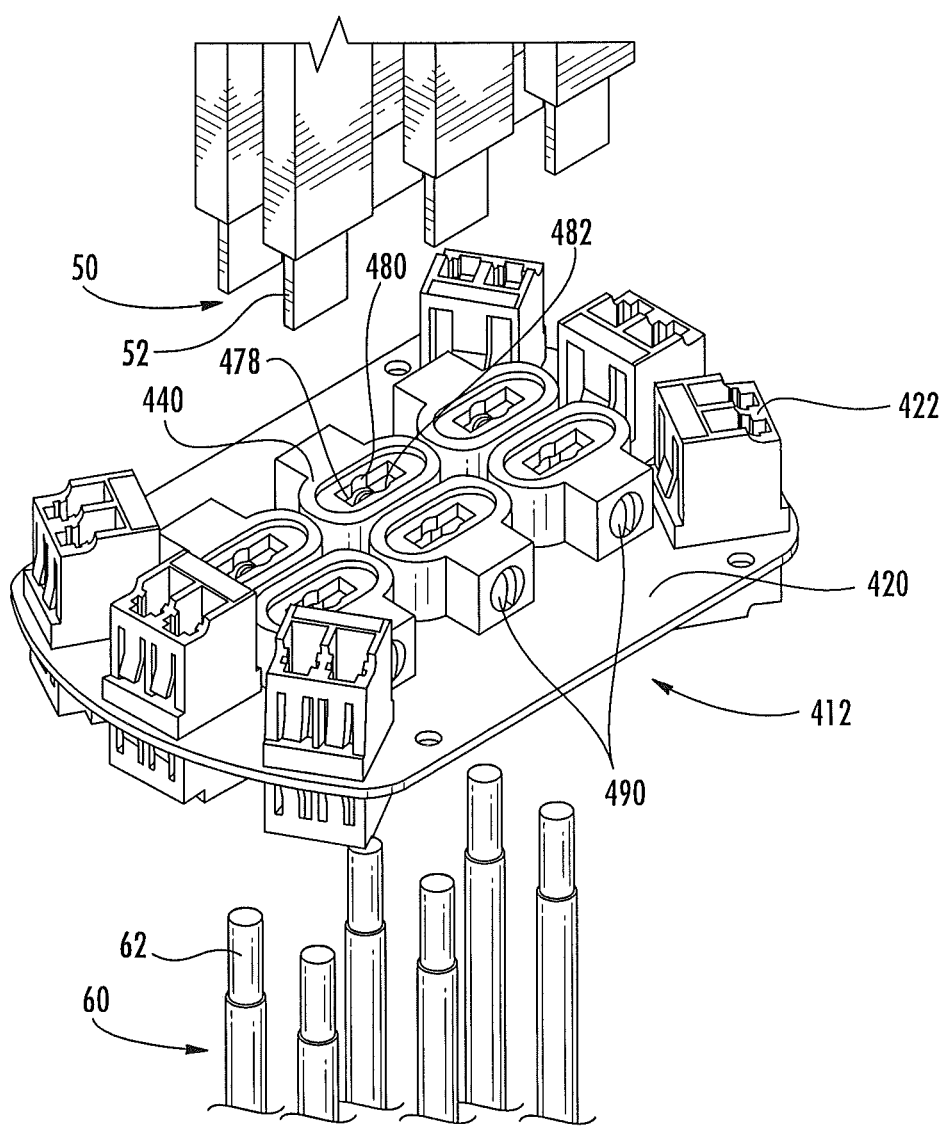
FIG. 4 is an exploded perspective view of six connectors of FIG. 6 mounted within a connector assembly showing how the connectors can be employed to connect a plurality of flat cables and a plurality of round cables.

Referring now to FIG. 4, another embodiment of a connector module, designated broadly at 412, is illustrated therein. The connector module 412 is similar to the connector module 112 in that it has only one base plate 420, and that it includes LC adapters 422 mounted near the periphery of the base plate 420. However, the connector module 412 also includes six power ports 440. Each power port 440 has the capacity to receive a "flat" power conductor in one side and up to three separate round conductors in the opposite side. A more detailed description of the power port 440 is set forth below.

Figure 6:
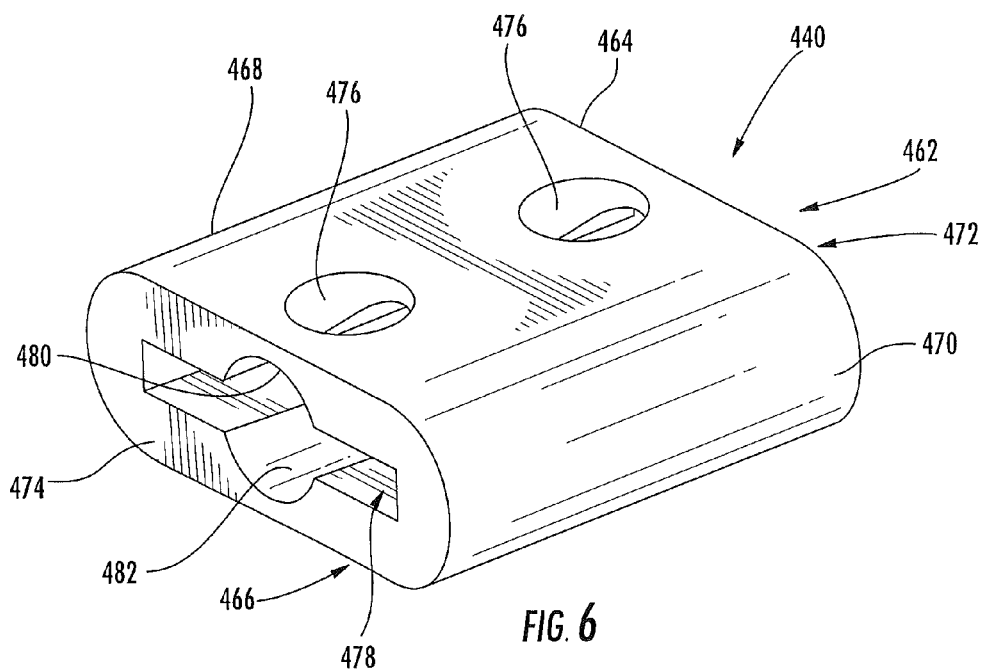
FIG. 6 is a perspective view of a connector for joining flat and round electrical cables according to embodiments of the present invention.

Referring to FIG. 6, the power port 440 comprises a body 462 (which can be unitary or formed of multiple pieces) having opposed top and bottom surfaces 464, 466, rounded sides 468, 470, and flat end faces 472, 474. A slot 478 extends between the end faces 472, 474. The slot 478 is generally rectangular in profile; the slot 478 typically has a height/width ratio of between about 0.25 and 0.5. Two generally semicylindrical recesses 480, 482 extend, respectively, upwardly and downwardly from a central portion of the slot 478 and are substantially aligned with each other on opposite edges of the slot 478. Two apertures 476 extend from the top surface 464 to the slot 478.

As can be seen in FIG. 4, the power port 440 can be used to interconnect a flat conductor with a round conductor. As shown, a flat cable 50 having a generally rectangular conductor 52 (six are shown in FIG. 4) can enter the slot 478 of one of the power ports 440 at one end (in this instance, from above) and would occupy a portion of the volume of the slot 478 with the exception of the recesses 480, 482. A round cable 60 having a generally round conductor 62 (six are shown in FIG. 4) can enter the slot 478 at the other end (in this instance, from below) and would fill portions of the recesses 480, 482, but not the remainder of the slot 478. The flat and round conductors 50, 60 abut each other within the body 462 of the power port 460. Screws 490 can be inserted into the apertures 476 to secure the conductors 50, 60 to the power ports 440.

The power ports 440 may be formed of virtually any material, but in some embodiments are formed of a conductive material such as tin-coated aluminum. The conductors 50, 60 are formed of conductive materials; in one embodiment, the flat conductor 50 is formed of aluminum, and the round conductor 60 is formed of copper.

It should also be noted that, in some embodiments, the screws 490 may be configured to bias the conductors 50, 60 into contact with the power port 440 to improve the electrical connection. Such screws (e.g., spring loaded screws) will be known to those of skill in this art.

Figure 3:
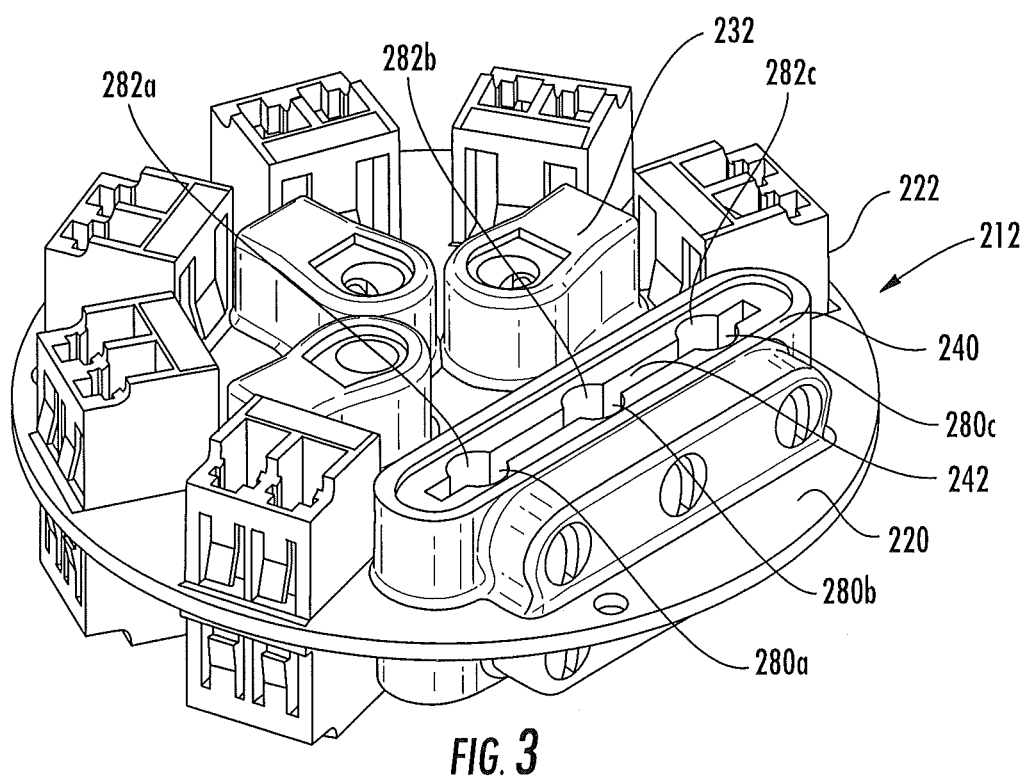
FIG. 3 is a perspective view of a connector module according to additional embodiments of the present invention.
Figure 7:
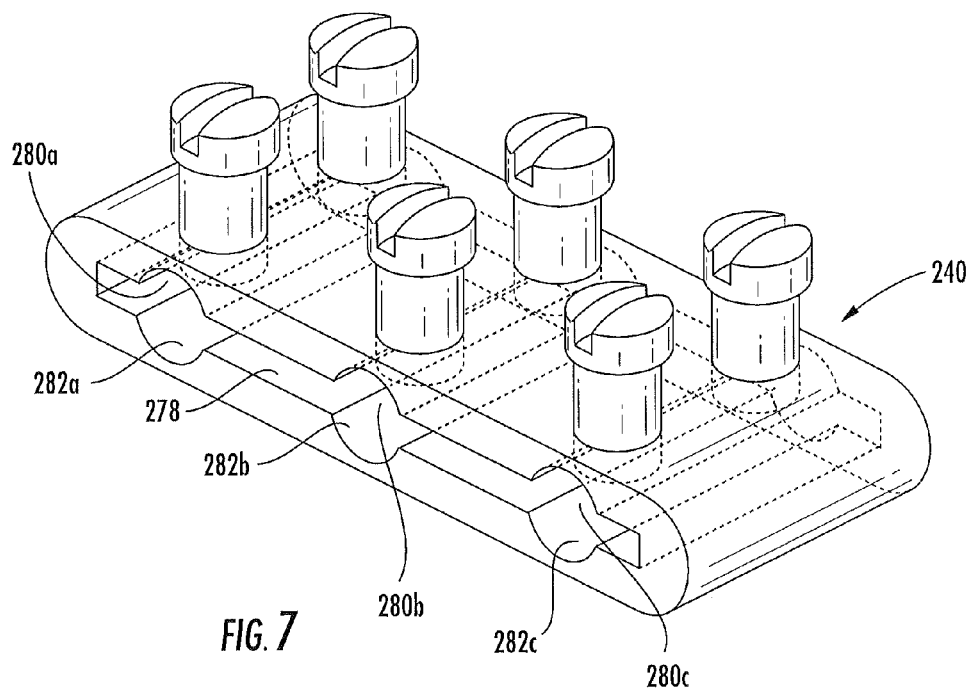
FIG. 7 is a perspective view of a connector for joining a flat electrical cable with up to three round electrical cables according to additional embodiments of the present invention.

A similar connector module 212 is shown in FIG. 3, which includes six LC adapters 222 and a power port 240 mounted on a base plate 220. The power port 240 (which is shown in FIG. 7) is similar to the power port 440 with the exception that six generally semicylindrical recesses 280a-c, 282a-c are present in the slot 278. As a result, the power port 240 can be employed to interconnect up to three different round conductors with a single flat conductor.

Figure 5:
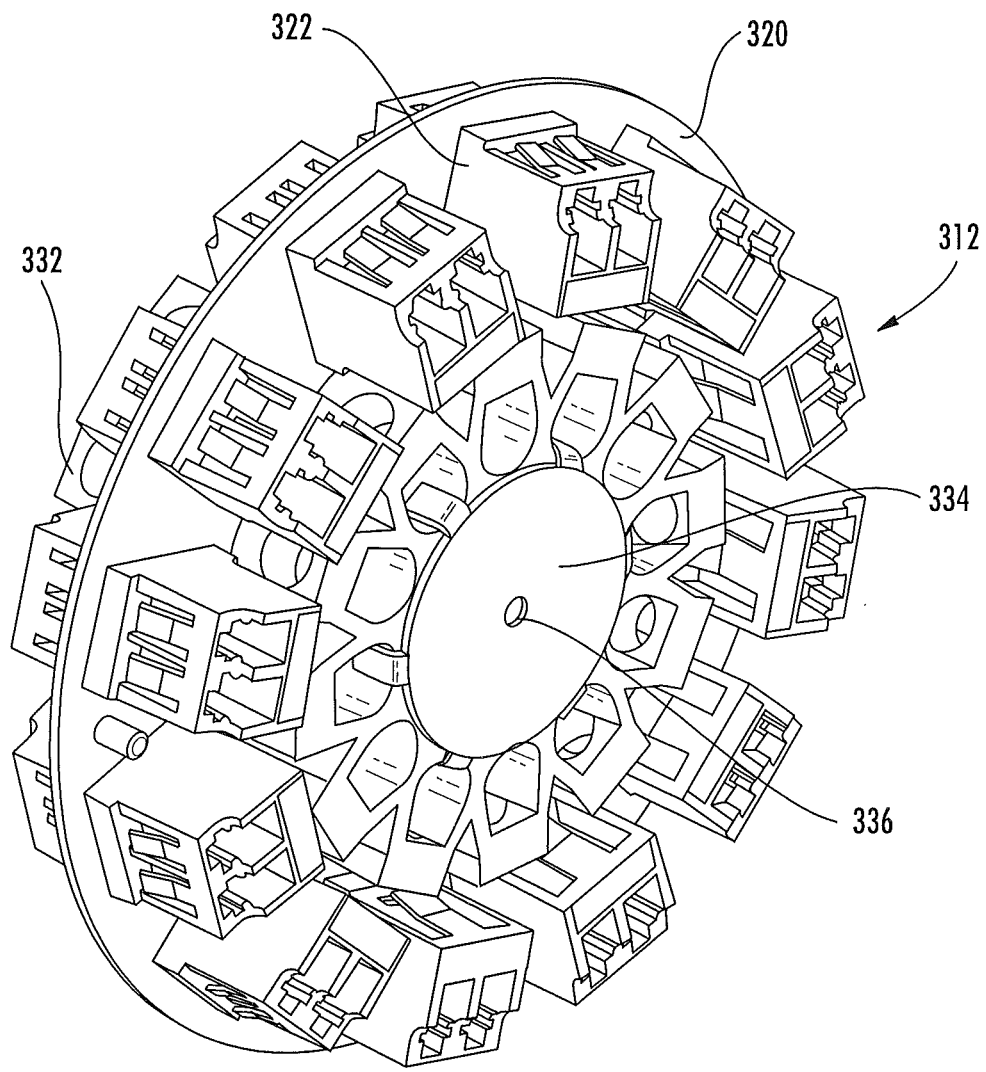
FIG. 5 is a perspective view of a connector module according to still further embodiments of the present invention.

Referring now to FIG. 5, a further embodiment of a connector module, designated at 312, is illustrated therein. The connector module 312 includes a single base plate 320, on which are mounted twelve LC adapters 322. Radially inwardly of the LC adapters 322, twelve power ports 332 are mounted on the base plate 320. However, the power ports 332 are configured to receive individual conductors on only one side (i.e., the "rear" side of FIG. 5); on the opposite side, a common contact plate 334 is mounted to the power ports 332 and is in electrical contact therewith. The common contact plate 334, which is formed of a conductive material, includes a central aperture 336 configured to receive a single conductor (not shown). This configuration enables power from multiple power conductors (in this instance, twelve) to be combined into a single conductor that exits the common contact plate 334.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A connector assembly for interconnecting hybrid optical fiber cables, comprising:
   (a) a connector module comprising:
   a mounting substrate;
   a plurality of fiber optic adapters mounted on the mounting substrate; and
   a plurality of power ports mounted on the mounting substrate; and
   (b) a housing within which the connector module resides, wherein the housing comprises two mating pieces, and wherein one of the mating pieces of the housing is configured to receive a hybrid fiber cable, and the other of the mating pieces of the housing is configured to receive a plurality of hybrid fiber jumper cables.

2. The connector assembly defined in claim 1, wherein the mounting substrate comprises a single base plate on which the plurality of fiber optic adapters and the plurality of power ports are mounted.

3. The connector assembly defined in claim 2, wherein the fiber optic adapters are mounted near the periphery of the base plate, and the power ports are mounted radially inwardly of the fiber optic adapters.

4. The connector assembly defined in claim 3, wherein the fiber optic adapters are arranged to be staggered relative to the power ports.

5. The connector assembly defined in claim 1, further comprising a hybrid fiber cable attached to the plurality of fiber optic ports and to the power ports.

6. A cable-connector assembly, comprising:
   (a) a connector assembly, comprising:
      (i) a connector module comprising:
      a mounting substrate;
      a plurality of fiber optic adapters mounted on the mounting substrate; and
      a plurality of power ports mounted on the mounting substrate; and
      (ii) a housing within which the connector module resides, wherein the housing comprises two mating pieces, and wherein a first of the mating pieces of the housing is configured to receive a hybrid fiber cable, and a second of the mating pieces of the housing is configured to receive a plurality of hybrid fiber jumper cables;
   (b) a hybrid optical fiber cable inserted through the first mating piece of the housing and attached to the fiber optic adapters and the power ports; and
   (c) a plurality of hybrid optical fiber jumper cables inserted through the second mating piece of the housing and attached to the fiber optic adapters and the power ports.

7. The connector-cable assembly defined in claim 6, wherein the mounting substrate comprises a single base plate on which the plurality of fiber optic adapters and the plurality of power ports are mounted.

8. The connector-cable assembly defined in claim 7, wherein the fiber optic adapters are mounted near the periphery of the base plate, and the power ports are mounted radially inwardly of the fiber optic adapters.

* * * * *